United States Patent
Arai

(10) Patent No.: US 8,427,786 B2
(45) Date of Patent: Apr. 23, 2013

(54) WIRING STRUCTURE FOR DEVICE ARRANGED ON HEAD SUSPENSION OPERATING ON LOW-FREQUENCY SIGNALS AND PERFORMING OTHER THAN A WRITE/READ FUNCTION

(75) Inventor: Hajime Arai, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 89 days.

(21) Appl. No.: 13/094,365

(22) Filed: Apr. 26, 2011

(65) Prior Publication Data

US 2011/0292549 A1    Dec. 1, 2011

(30) Foreign Application Priority Data

Jun. 1, 2010   (JP) .................................. 2010-126302

(51) Int. Cl.
   *G11B 5/48*    (2006.01)
(52) U.S. Cl.
   USPC ..................................... 360/245.9; 360/234.5
(58) Field of Classification Search ............... 360/245.9, 360/245.8, 234.4, 234.5, 264.2; 174/254, 174/258
   See application file for complete search history.

(56) References Cited

U.S. PATENT DOCUMENTS

| | | | | |
|---|---|---|---|---|
| 8,102,628 B2 * | 1/2012 | Ota et al. | .................... | 360/245.9 |
| 8,208,226 B2 * | 6/2012 | Kawano | ..................... | 360/245.9 |
| 8,247,700 B2 * | 8/2012 | Ishii et al. | ..................... | 174/254 |
| 8,248,732 B2 * | 8/2012 | Nishiyama et al. | ........ | 360/245.9 |
| 2004/0070884 A1 * | 4/2004 | Someya et al. | ............ | 360/245.9 |
| 2004/0181932 A1 * | 9/2004 | Yao et al. | .................... | 29/603.03 |
| 2006/0187587 A1 * | 8/2006 | Arai et al. | .................. | 360/245.9 |
| 2008/0000673 A1 * | 1/2008 | Ishii et al. | ..................... | 174/250 |
| 2008/0273266 A1 * | 11/2008 | Pro | ............................ | 360/234.5 |
| 2010/0110590 A1 * | 5/2010 | Ohsawa et al. | ............ | 360/234.5 |

FOREIGN PATENT DOCUMENTS

| | | |
|---|---|---|
| JP | 2008-052882 | 3/2008 |
| JP | 2008-152868 | 7/2008 |

* cited by examiner

*Primary Examiner* — Brian Miller
(74) *Attorney, Agent, or Firm* — Jordan and Hamburg LLP

(57) ABSTRACT

A head suspension has a head to write and read information to and from a recording medium, a load beam to apply load onto the head, a device arranged on the head, and a flexure. The device operates on low-frequency signals to achieve a function other than a write/read function. The flexure is attached to the load beam and supports the head. The flexure includes a base material made of a conductive thin plate and a base insulating layer formed on the base material. A wiring structure formed on the head suspension has a write wiring, a read wiring, a device wiring, and an intermediate insulating layer. The device wiring is formed wider than the read wiring and includes positive/negative wires that are laid one on another with the intermediate insulating layer interposed between the positive/negative wires.

18 Claims, 18 Drawing Sheets

|  | Sensor & heater | Write side | Read side |
|---|---|---|---|
| Signal transmission loss | Low | Low | Low |
| Wiring impedance | Low | Low | High |
| Bandwidth | Narrow | Wide | Preferably wide |
| Adopted structure | Wide and layered | Grand plane or interleave | Conventional |

WIRING STRUCTURE FOR DEVICE ARRANGED ON HEAD SUSPENSION OPERATING ON LOW-FREQUENCY SIGNALS AND PERFORMING OTHER THAN A WRITE/READ FUNCTION

BACKGROUND OF THE INVENTION

1. Field of the Invention

The present invention relates to a wiring structure for a head suspension, the head suspension supporting a magnetic head to write and read data to and from a magnetic disk (hard disk) in a magnetic disk drive of, for example, an information processing unit such as a personal computer.

2. Description of Related Art

The magnetic disk drives or hard disk drives are required to realize a high recording density. For this, a floating amount of the magnetic head of the head suspension from a recording face of a hard disk on which the head suspension operates must be minimized. In recent years, the floating amount is in the order of ten nanometers.

Reducing the floating amount of the head, however, results in increasing a risk of the head hitting very small projections if exist on the surface of the hard disk. In addition, the head involves an individual clearance variation in a tolerance range, and therefore, the floating amount of the head is unable to be lowered below the tolerance range, or the head will hit the hard disk.

To deal with this problem, Japanese Unexamined Patent Application Publication No. 2008-52882 proposes a technique of incorporating a heater in the head of the head suspension. The heater is energized to thermally expand, thereby controlling a clearance between the head and a recording face of the hard disk.

This related art employs a low-heat-expansion layer having a piezoelectric sensor structure. If a medium-confronting surface of the head protruding toward the hard disk due to energization of the heater coil hits a medium surface of the hard disk, a shock is applied to the piezoelectric sensor structure, which outputs a shock-corresponding voltage from a signal output terminal to the outside.

The shock-corresponding voltage is used to control a current to the heater coil, thereby controlling the floating amount of the head from the recording face of the hard disk.

As another related art, Japanese Unexamined Patent Application Publication No. 2008-152868 discloses a heat assist magnetic head having a near-field light emitter (plasmon probe) to emit near-field light to heat the recording layer of the magnetic disk, thereby thermally stabilizing magnetization of the recording layer.

The head suspension arranged in the hard disk drive has a flexure. The flexure has a four-layer structure including a base material made of a resilient stainless thin plate, a base insulating layer of flexible resin formed on the base material, wiring formed on the base insulating layer and connected to the head of the head suspension to transmit write/read signals, and a cover insulating layer of flexible resin formed over the wiring.

To such a wiring structure of the flexure, simply adding wiring for the above-mentioned heater, sensor, heat assist element, and other devices will cause a problem of widening the flexure.

The wiring for the additional devices such as the heater, sensor, and heat assist element must minimize a power loss to reduce power consumption. A signal frequency used by the sensor is less than or equal to $\frac{1}{10}$ of that of a write signal, and therefore, the sensor needs narrow-band wiring because wide-band wiring is unable to suppress noise. The wiring for the additional devices, therefore, must be wide. This requirement, however, results in widening the flexure and making it difficult to miniaturize the head suspension.

SUMMARY OF THE INVENTION

An object of the present invention is to provide a wiring structure for a head suspension, capable of adding wiring for a device operating on low-frequency signals to a flexure of the head suspension without deteriorating characteristics required for the wiring while minimizing the width of the flexure.

In order to accomplish the object, an aspect of the present invention provides a wiring structure for a head suspension, the head suspension having a head to write and read information to and from a recording medium, a load beam to apply load onto the head, a device arranged on the head and operating on low-frequency signals to achieve a function other than the information write/read function at the head, and a flexure attached to the load beam and supporting the head, the flexure including a base material made of a conductive thin plate and a base insulating layer formed on the base material. The wiring structure has a write wiring and a read wiring formed on the base insulating layer and connected to the head, a device wiring formed on the base insulating layer and connected to the device, an intermediate insulating layer on the base insulating layer, and the device wiring being formed wider than the read wiring and including positive/negative wires that are laid one on another with the intermediate insulating layer interposed between the positive/negative wires.

According to this aspect of the present invention, the device wiring is wider than the read wiring, to realize a low signal loss and a narrow band, minimize an influence of noise, and satisfy required characteristics. The positive/negative wires of the device wiring are laid one on another with the intermediate insulating layer interposed between them, to minimize the width of the flexure.

DETAILED DESCRIPTION OF EMBODIMENTS

Embodiments to be explained below each arrange wiring for a device operating on low-frequency signals without spoiling required characteristics and unnecessarily increasing or minimizing the width of a flexure on which the device wiring is arranged. For this, each embodiment widens the width of positive/negative wires of the device wiring by laying the positive/negative wires one on another.

Figure 1:
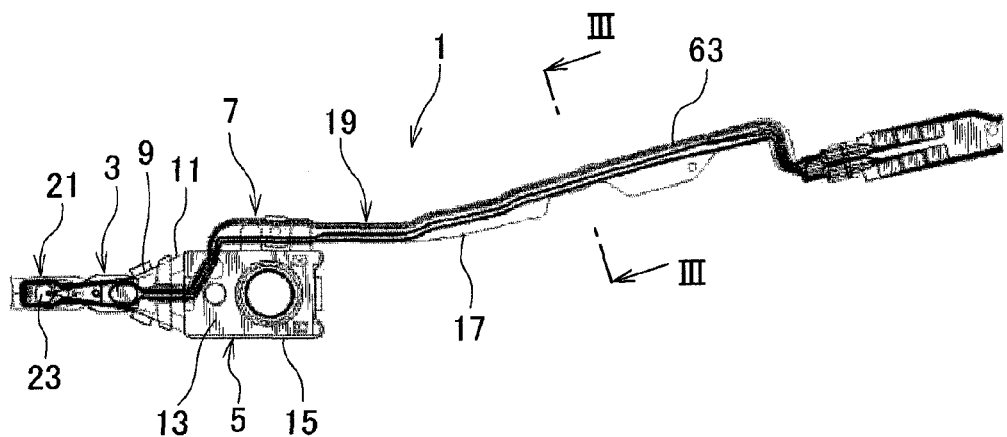
FIG. 1 is a plan view illustrating a head suspension employing a wiring structure according to a first embodiment of the present invention.
Figure 2:
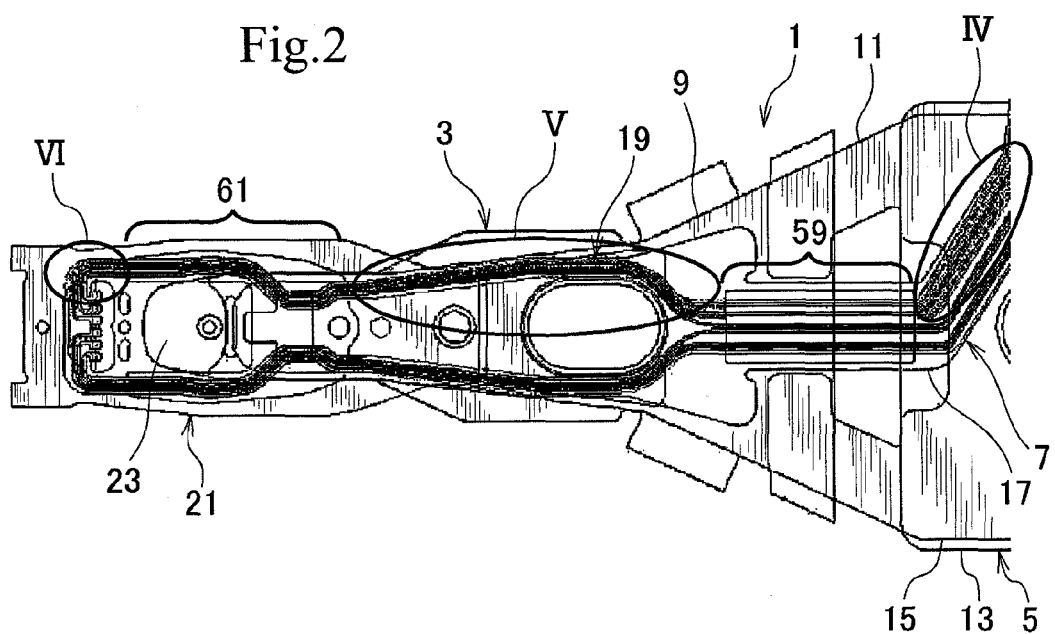
FIG. 2 is an enlarged plan view illustrating a part of the head suspension of FIG. 1.

A head suspension employing a wiring structure according to a first embodiment of the present invention will be explained with reference to FIGS. 1 and 2 in which FIG. 1 is a plan view illustrating the head suspension and FIG. 2 is an enlarged plan view illustrating a part of the head suspension.

As illustrated in FIGS. 1 and 2, the head suspension 1 has a load beam 3, a base 5, and a flexure 7.

The load beam 3 includes a rigid part 9 and a resilient part 11 to apply load onto a head 21. The rigid part 9 is made of, for example, stainless steel and is relatively thick, for example, about 100 μm.

The resilient part 11 is separate from the rigid part 9, is made of, for example, a resilient thin stainless steel rolled plate, and has a low and precision spring constant that is lower than that of the rigid part 9. The resilient part 11 has a thickness of about 40 μm. An end of the resilient part 11 is fixed to a rear end of the rigid part 9 by, for example, laser welding. The other end of the resilient part 1 is integral with a reinforcing plate 13.

The reinforcing plate 13 is laid on and fixed to a base plate 15 of the base 5 by, for example, laser welding.

Namely, the base plate 15 is reinforced with the reinforcing plate 13, to form the base 5. The base 5 is attached to a carriage arm (not illustrated) so that the head suspension 1 is turned through the carriage arm.

The flexure 7 includes a base material 17. The base material 17 is made of a resilient conductive thin plate such as a resilient thin stainless steel rolled plate (SST) having a thickness in the range of about 15 to 30 μm. On the base material 17, an electrical insulating layer is formed. On the insulating layer, a wiring pattern 19 is formed. The flexure 7 is fixed to the rigid part 9 of the load beam 3 by, for example, laser welding. An end of the wiring pattern 19 is electrically connected to the head 21 and the other end thereof is extended toward the base 5.

The flexure 7 supports a cantilever tongue 23 on which a slider of the head 21 is arranged.

The head 21 has a write element such as an inductive magnetic transducer element and a read element such as an MR element, a GMR element, or a TuMR element to realize a high read sensitivity.

A heater and sensor incorporated in the head 21 will be explained with reference to FIG. 3 that is an enlarged sectional view of the head including the heater and sensor.

Figure 3:
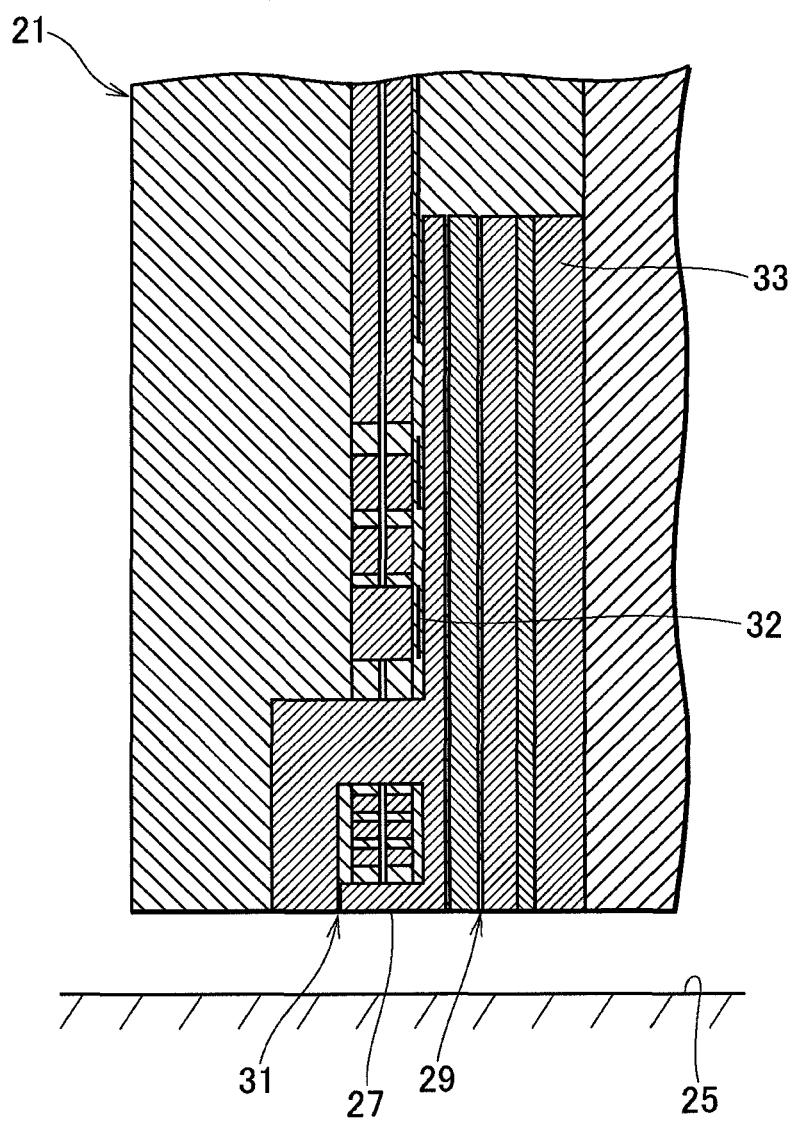
FIG. 3 is an enlarged sectional view illustrating a head of the head suspension of FIG. 1 including a heater and a sensor.

As illustrated in FIG. 3, the head 21 includes a read head 29 and a write head 31 that are exposed on a medium-confronting face 27 to face a hard disk 25 serving as a recording medium. The head 21 also includes a heater coil 32 for a heater and a low-thermal-expansion layer 33 for a sensor each serving as a device operating on low-frequency signals. This configuration is disclosed in Japanese Unexamined Patent Application Publication No. 2008-52882.

The heater coil 32 thermally expands the medium-confronting face 27, thereby displacing the face 27 relative to the hard disk 25.

The low-thermal-expansion layer 33 has a structure as a piezoelectric sensor. If the medium-confronting face 27 hits the surface of the hard disk 25 due to energization of the heater coil 32, a shock is applied to the structure as the piezoelectric sensor of the low-thermal-expansion layer 33, which outputs a shock-corresponding voltage from a signal output terminal to the outside.

The shock-corresponding voltage is used to detect if the medium-confronting face 27 hits the hard disk 25. Based on a result of the detection, a current to the heater coil 32 is controlled to control a floating amount of the head 21 from the surface of the hard disk 25.

Figures 4, 5:
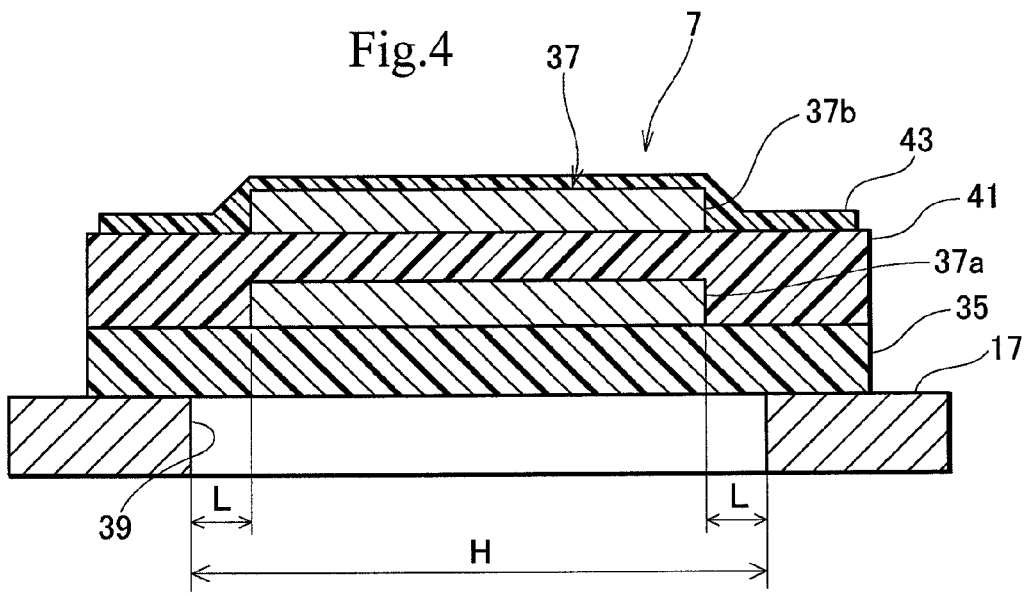
FIG. 4 is a sectional view taken along a line III-III of FIG. 1, illustrating a part of the wiring structure that demonstrates a basic layer configuration thereof according to the first embodiment.
FIG. 5 is a table listing characteristics required for the head of the head suspension of FIG. 1.

A basic sectional structure of the flexure 7 will be explained. FIG. 4 is a sectional view taken along a line III-III of FIG. 1 and illustrating a sensor wiring part as a part of the wiring structure that demonstrates a basic layer configuration thereof.

In FIG. 4, the flexure 7 has the base material 17, a base insulating layer 35 that is an electrical insulating layer formed on the base material 17, and sensor wiring 37 formed on the base insulating layer 35.

The base material 17 has a window 39 formed through the base material 17 in a thickness direction and having a width H. The window 39 functions to increase impedance and realize wide bandwidth. In a width direction of the flexure 7, an inner wall of the window 39 is separated away from the sensor wiring 37 by a distance L. Plural windows 39 are formed at proper positions along the sensor wiring 37 in a longitudinal direction of the flexure 7. By adjusting a tile ratio of the windows 39, the impedance and bandwidth of the sensor wiring 37 is adjustable.

The base insulating layer 35 is made of flexible insulating resin such as polyimide and has a thickness in the range of about 5 to 20 μm.

The sensor wiring 37 includes positive/negative wires 37a and 37b that are laid one on another with an intermediate insulating layer 41 of polyimide interposed between them. The sensor wiring 37 is covered with a cover insulating layer 43 on the intermediate insulating layer 41.

The cover insulating layer 43 is made of flexible insulating resin such as polyimide and has a thickness in the range of about 1 to 20 μm. The cover insulating layer 43 covers the surface of the sensor wiring 37 and protects the sensor wiring 37 from external force and the like.

Characteristics required for the flexure 7 will be explained with reference to a table of FIG. 5.

As listed in FIG. 5, the sensor wiring, heater wiring, write wiring, and read wiring of the flexure 7 have required characteristics in connection with signal transmission loss, wiring impedance, and bandwidth.

In connection with signal transmission loss, every wiring must have low signal transmission loss.

In connection with wiring impedance, the sensor wiring and write wiring are required to have low impedance and the read wiring is required to have high impedance because of a TuMR element used as the read element.

In connection with bandwidth, the heater and sensor seldom operate and the sensor requires a narrow bandwidth because the sensor is affected by noise if the bandwidth is wide. The write wiring requires a wide bandwidth to conduct a high-speed write operation. The read wiring does not always require a wide bandwidth.

The flexure 7 is required to be as narrow as possible in a width direction.

Figure 6:
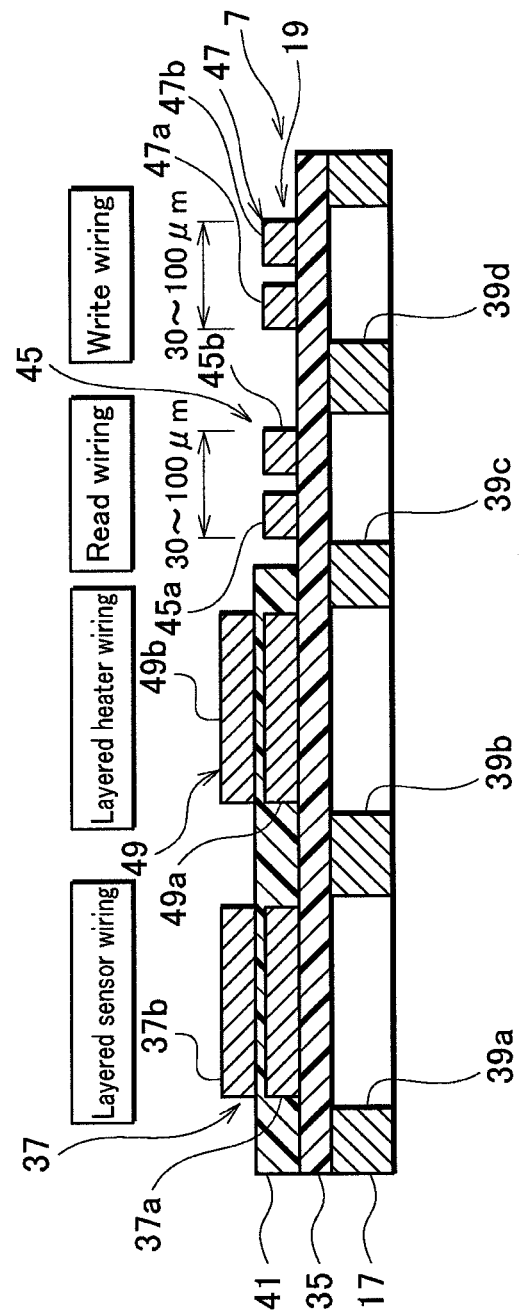
FIG. 6 is a sectional view at a location corresponding to the location of line III-III of FIG. 1, illustrating the layer configuration of the wiring structure according to the first embodiment, a cover insulating layer being omitted.

A configuration of the flexure 7 will be explained. FIG. 6 is a sectional view at a location corresponding to the location of line III-III of FIG. 1, illustrating a wiring structure of the flexure 7 according to the first embodiment, the cover insulating layer 43 being omitted.

As illustrated in FIG. 6, the wiring pattern 19 of the flexure 7 includes the read wiring 45 and write wiring 47 that are connected to the head 21, the heater wiring 49 connected to the heater (heater coil 32), and the sensor wiring 37 connected to the sensor (low-thermal-expansion layer 33).

The heater wiring 49 and sensor wiring 37 each serving as a device wiring are wider than any one of the read wiring 45 and write wiring 47. The heater wiring 49 includes positive/negative wires 49a and 49b that are laid one on another with the intermediate insulating layer 41 interposed between them. The sensor wiring 37 includes the positive/negative wires 37a and 37b that are laid one on another with the intermediate insulating layer 41 interposed between them. The heater wiring 49 and sensor wiring 37 are made by copper plating and each have a thickness in the range of about 1 to 20 μm.

In FIG. 6, the sensor wiring 37 is labeled as "layered sensor wiring" and the heater wiring 49 as "layered heater wiring".

To satisfy the required characteristics listed in FIG. 5, at least the sensor wiring 37 is made to be wider than the read wiring 45 and the positive/negative wires 37a and 37b are laid one on another with the intermediate insulating layer 41 interposed between them.

The read wiring 45 and write wiring 47 are made by copper plating and each have a thickness in the range of about 1 to 20 μm. The read wiring 45 includes positive/negative wires 45a and 45b arranged in a width of about 30 to 100 μm. The width in which the positive/negative wires 45a and 45b are arranged is the width of the read wiring 45. The write wiring 47 includes positive/negative wires 47a and 47b arranged in a width of about 30 to 100 μm. The width in which the positive/negative wires 47a and 47b are arranged is the width of the write wiring 47.

The window 39 formed through the base material 17 of the flexure 7 includes a window 39a corresponding to the sensor wiring 37, a window 39b corresponding to the heater wiring 49, a window 39c corresponding to the read wiring 45, and a window 39d corresponding to the write wiring 47.

The sensor wiring 37, heater wiring 49, read wiring 45, and write wiring 47 are covered with the cover insulating layer 43 (FIG. 4).

In this way, according to the first embodiment of the present invention, the head suspension 1 has the head 21 to write and read information to and from the hard disk 25, the load beam 3 to apply load onto the head 21, the heater coil 32 arranged on the head 21 to thermally expand and displace the medium-confronting face 27 of the head 21 relative to the hard disk 25, the low-thermal-expansion layer 33 arranged on the head 21 to detect if the medium-confronting face 27 hits the hard disk 25, and the flexure 7 attached to the load beam 3 and supporting the head 21, the flexure 7 including the base material 17 made of a conductive thin plate and the base insulating layer 35 formed on the base material 17.

The wiring structure of the head suspension 1 has the write wiring 47 and read wiring 45 formed on the base insulating layer 35 and connected to the head 21, the heater wiring 49 connected to the heater coil 32 and the sensor wiring 37 connected to the low-thermal-expansion layer 33 each formed on the base insulating layer 35, and the intermediate insulating layer 41. The sensor wiring 37 and heater wiring 49 each are made to be wider than the read wiring 45. The sensor wiring 37 includes the positive/negative wires 37a and 37b that are laid one on another with the intermediate insulating layer 41 interposed between them. The heater wiring 49 includes the positive/negative wires 49a and 49b that are laid one on another with the intermediate insulating layer 41 interposed between them.

The sensor wiring 37 and heater wiring 49 each are made to be wider than the read wiring 45, to satisfy the characteristics required for the components of the flexure 7 to reduce a signal loss and realize a narrow bandwidth to suppress an influence of noise on the sensor (low-thermal-expansion layer 33) and the like as mentioned above. At the same time, the positive/ negative wires 37a and 37b (49a and 49b) laid one on another with the intermediate insulating layer 41 interposed between them, to minimize the width of the flexure 7.

In this way, the first embodiment satisfies the characteristics required for the components of the flexure 7 while minimizing the width of the flexure 7.

According to the first embodiment, the sensor wiring 37 is arranged away from the write wiring 47, and therefore, high-frequency signals transmitted through the write wiring 47 hardly influence the sensor wiring 37, thereby securing an accuracy of the sensor (low-thermal-expansion layer 33).

A wiring structure for a head suspension according to a second embodiment of the present invention will be explained with reference to FIG. 7 that is a sectional view at a location corresponding to the location of line III-III of FIG. 1.

Figure 7:
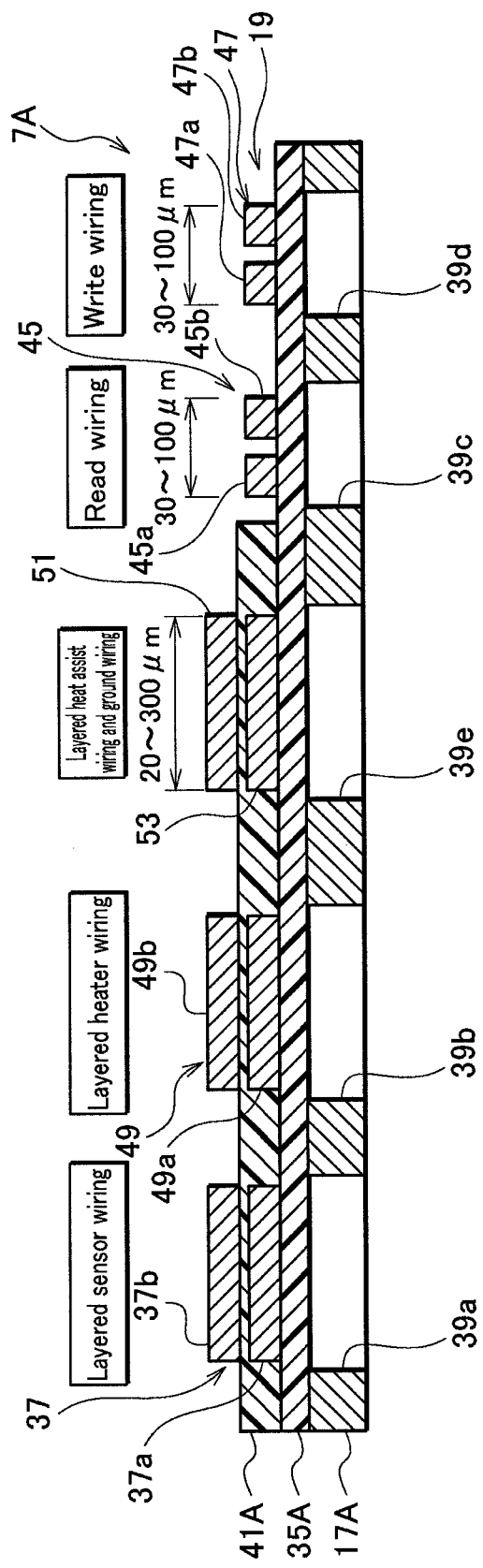
FIG. 7 is a sectional view at a location corresponding to the location of line III-III of FIG. 1, illustrating a layer configuration of a wiring structure according to a second embodiment of the present invention, a cover insulating layer being omitted.

A basic configuration of the second embodiment is the same as that of the first embodiment of FIG. 6, and therefore, the parts of FIG. 7 that are the same as or similar to those of FIG. 6 are represented with the same reference marks or the same reference marks plus "A" to omit overlapping explanation.

Similarly, the head suspension to which the wiring structure of the second embodiment is applied is the same as that of the first embodiment illustrated in FIGS. 1 and 2, and therefore, the details of the head suspension itself will not be explained. Only a characteristic part of the wiring structure according to the second embodiment will be explained.

According to the second embodiment, the head 21 additionally includes a near-field light emitter (plasmon probe) serving as a device operating on low-frequency signal to emit near-field light that heats a recording layer part of the hard disk (magnetic disk) 25 to secure thermal stability of magnetization. Namely, the head 21 is a heat assist magnetic head which is disclosed in, for example, Japanese Unexamined Patent Application Publication No. 2008-152868.

A flexure 7A having the wiring structure of the second embodiment includes heat assist wiring 51 and ground wiring 53 that are made by copper plating and have a thickness in the range of about 1 to 20 μm. The ground wiring 53 is grounded to, for example, a base material 17A of the flexure 7A.

The ground wiring 53 is formed on the base insulating layer 35A and covered with an intermediate insulating layer 41A. On the intermediate insulating layer 41A, the heat assist wiring 51 is formed. Namely, the heat assist wiring 51 as a device wiring and ground wiring 53 are laid one on another with the intermediate insulating layer 41A interposed between them and have the same width of, for example, about 20 to 300 μm as the heater wiring 49.

Sensor wiring 37, heater wiring 49, the heat assist wiring 51, read wiring 45, and write wiring 47 are arranged side by side in this order.

The base material 17A has a window 39e at a location corresponding to the heat assist wiring 51 and ground wiring 53.

The sensor wiring 37, heater wiring 49, heat assist wiring 51, read wiring 45, and write wiring 47 are covered with a cover insulating layer equivalent to the cover insulating layer 43 of FIG. 4.

The second embodiment provides effect that is similar to the effect of the first embodiment, and in addition, reduces the loss and impedance of the heat assist wiring 51 and narrows the bandwidth thereof.

A wiring structure for a head suspension according to a third embodiment of the present invention will be explained with reference to FIG. 8 that is a sectional view at a location corresponding to the location of line III-III of FIG. 1.

Figure 8:
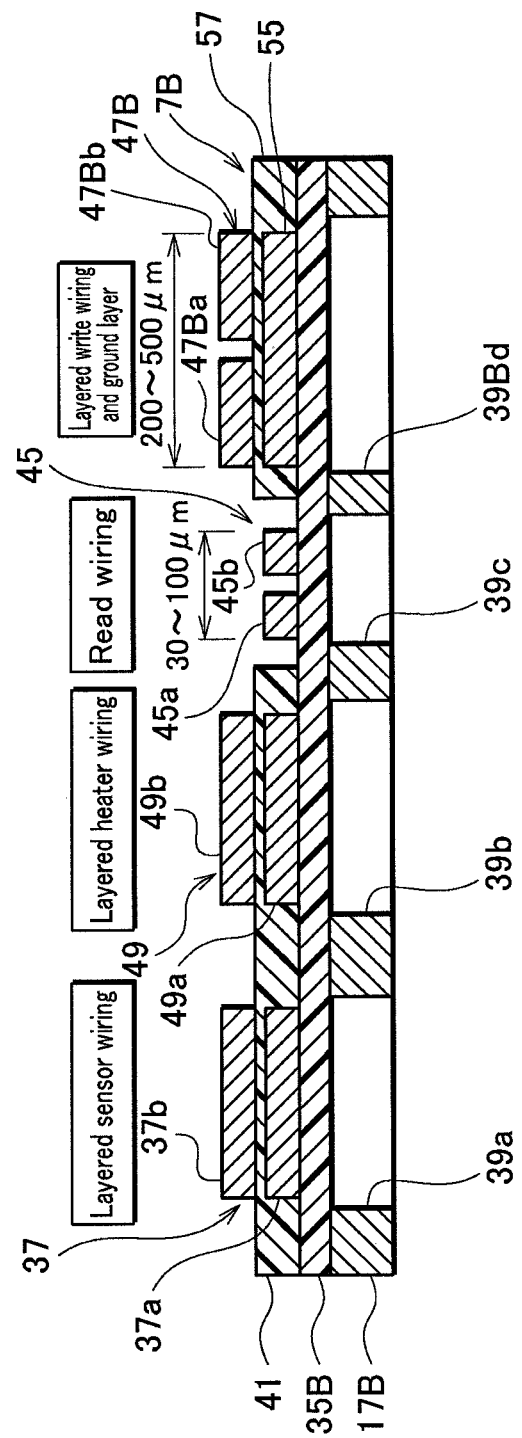
FIG. 8 is a sectional view at a location corresponding to the location of line III-III of FIG. 1, illustrating a layer configuration of a wiring structure according to a third embodiment of the present invention, a cover insulating layer being omitted.

A basic configuration of the third embodiment is the same as that of the first embodiment of FIG. 6, and therefore, the parts of FIG. 8 that are the same as or similar to those of FIG. 6 are represented with the same reference marks or the same reference marks plus "B" to omit overlapping explanation.

Similarly, the head suspension to which the wiring structure of the third embodiment is applied is the same as that illustrated in FIGS. 1 and 2, and therefore, the details of the head suspension itself will not be explained. Only a characteristic part of the wiring structure according to the third embodiment will be explained.

A flexure 7B having the wiring structure of the third embodiment includes write wiring 47B that is wider than read wiring 45 and is formed on an intermediate insulating layer 57. Formed under the intermediate insulating layer 57 is a ground layer 55. The ground layer 55 is formed on a base insulating layer 35B and is covered with the intermediate insulating layer 57. Namely, the write wiring 47B and ground layer 55 are laid one on another with the intermediate insulating layer 57 interposed between them. The write wiring 47B is narrower than sensor wiring 37 and heater wiring 49.

The ground layer 55 is formed in one or more areas (at least one area) corresponding to a part of the write wiring 47B in a longitudinal direction of the write wiring 47B and has a higher conductivity than the base material 17B. According to the third embodiment, the ground layer 55 is made by copper plating and has a thickness of about 3 μm or thicker, preferably, in the range of about 5 to 10 μm.

The ground layer 55 has a width in the range of about 200 to 500 μm and each side of the ground layer 55 agrees with an outer side of positive/negative wires 47Ba and 47Bb that form the write wiring 47B.

Sensor wiring 37, heater wiring 49, read wiring 45, and the write wiring 47B are arranged side by side in this order.

The ground layer 55 is formed not to affect the movement characteristic of the head 21 with respect to the hard disk 25. In other words, the ground layer 55 is formed not to affect stiffness among the mechanical characteristics of the head suspension 1. More precisely, in the longitudinal direction of the flexure 7B, the ground layer 55 is formed by avoiding an area 59 (FIG. 2) where the resilient part 11 supports the load beam 3 with respect to the base 5 and an outrigger area 61 (FIG. 2) of the flexure 7B. According to the third embodiment, the ground layer 55 is formed in a tale part 63 (FIG. 1) including an area IV (FIG. 2) and in areas V and VI (FIG. 2) of the flexure 7B. The ground layer 55 may be formed only in the tale part 63 that mainly determines electric characteristics and may not be formed in the areas V and VI.

The base material 17B has a window 39Bd similar to the window 39 at a location corresponding to the write wiring 47B and ground layer 55.

The sensor wiring 37, heater wiring 49, read wiring 45, and write wiring 47B are covered with a cover insulating layer equivalent to the cover insulating layer 43 of FIG. 4.

The third embodiment provides effect that is similar to the effect of the first embodiment, and in addition, reduces the loss and impedance of the write wiring 47B and widens the bandwidth thereof.

A wiring structure for a head suspension according to a fourth embodiment of the present invention will be explained with reference to FIG. 9 that is a sectional view at a location corresponding to the location of line III-III of FIG. 1.

Figure 9:
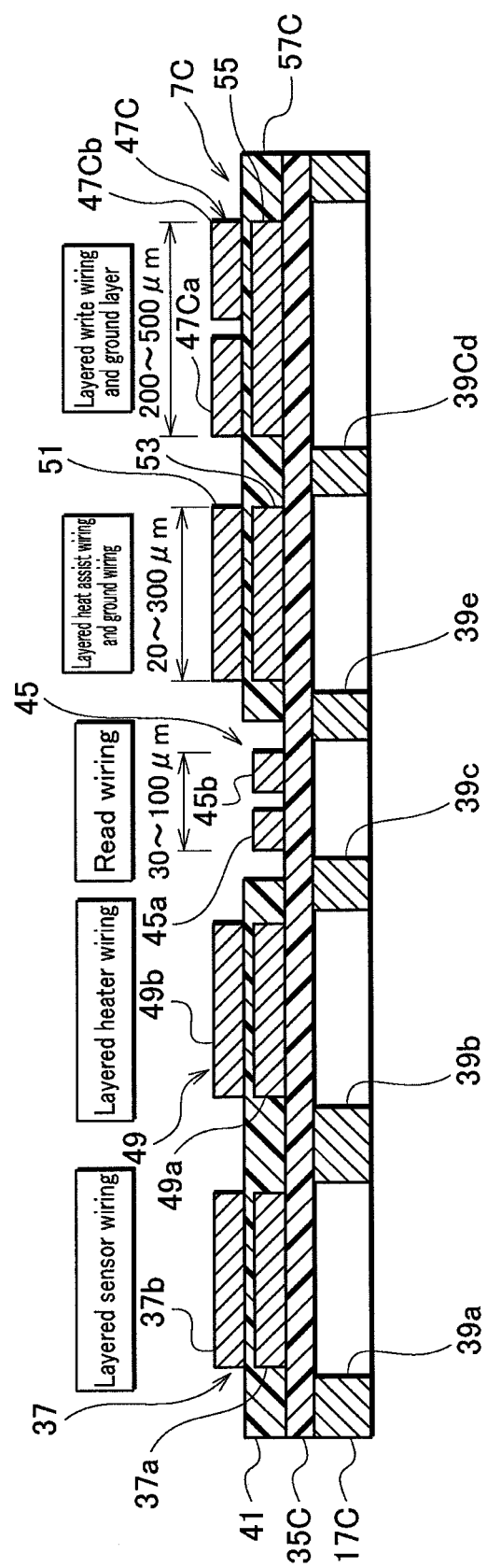
FIG. 9 is a sectional view at a location corresponding to the location of line III-III of FIG. 1, illustrating a layer configuration of a wiring structure according to a fourth embodiment of the present invention, a cover insulating layer being omitted.

A basic configuration of the fourth embodiment is the same as that of the third embodiment of FIG. 8, and therefore, the parts of FIG. 9 that are the same as or similar to those of FIG.

8 are represented with the same reference marks or the same reference marks plus "C" instead of "B" to omit overlapping explanation.

Similarly, the head suspension to which the wiring structure of the fourth embodiment is applied is the same as that illustrated in FIGS. 1 and 2, and therefore, the details of the head suspension itself will not be explained. Only a characteristic part of the wiring structure according to the fourth embodiment will be explained.

A flexure 7C having the wiring structure of the fourth embodiment includes, in addition to the wiring structure of the third embodiment of FIG. 8, heat assist wiring 51 and ground wiring 53 like the second embodiment of FIG. 7. The ground wiring 53 is formed on the base insulating layer 35C and covered with an intermediate insulating layer 57C. On the intermediate insulating layer 57C, the heat assist wiring 51 is formed. Namely, the heat assist wiring 51 and ground wiring 53 are laid one on another with the intermediate insulating layer 57C interposed between them.

Sensor wiring 37, heater wiring 49, read wiring 45, the heat assist wiring 51, and write wiring 47C are arranged side by side in this order.

The sensor wiring 37, heater wiring 49, read wiring 45, heat assist wiring 51, and write wiring 47C are covered with a cover insulating layer equivalent to the cover insulating layer 43 of FIG. 4.

The fourth embodiment provides effect that is similar to the effect of the third embodiment, and in addition, reduces the loss and impedance of the heat assist wiring 51 and narrows the bandwidth thereof.

A wiring structure for a head suspension according to a fifth embodiment of the present invention will be explained with reference to FIG. 10 that is a sectional view at a location corresponding to the location of line III-III of FIG. 1.

Figure 10:
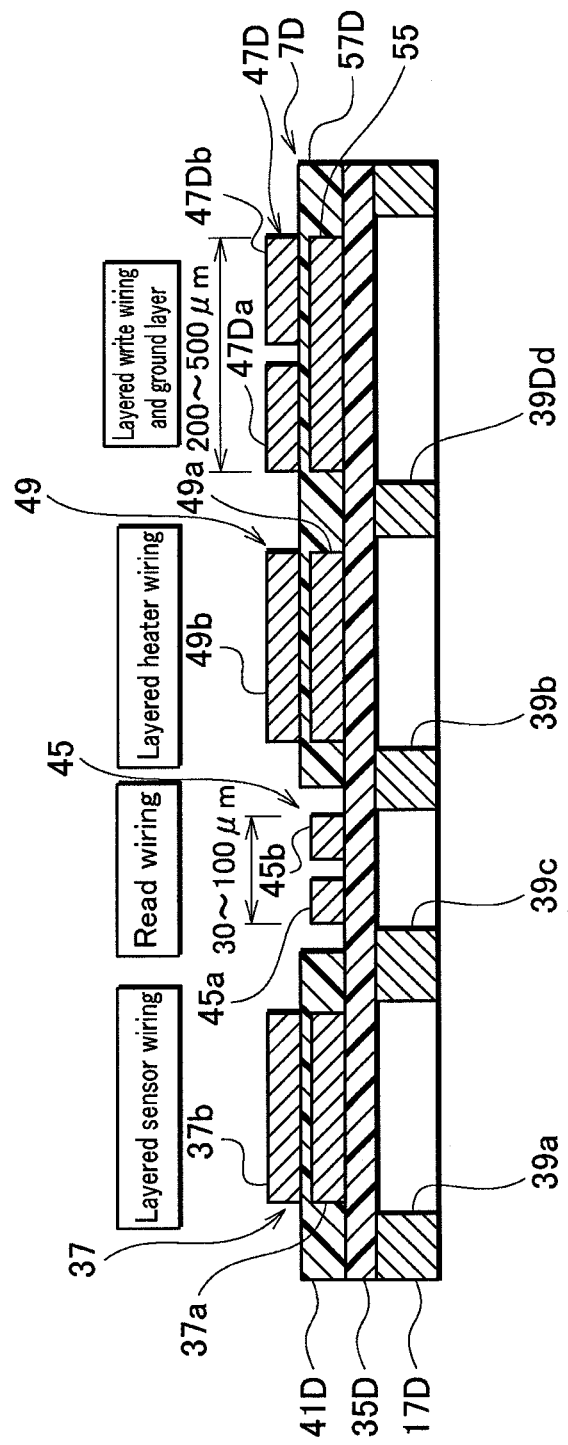
FIG. 10 is a sectional view at a location corresponding to the location of line III-III of FIG. 1, illustrating a layer configuration of a wiring structure according to a fifth embodiment of the present invention, a cover insulating layer being omitted.

A basic configuration of the fifth embodiment is the same as that of the third embodiment of FIG. 8, and therefore, the parts of FIG. 10 that are the same as or similar to those of FIG. 8 are represented with the same reference marks or the same reference marks plus "D" instead of "B" to omit overlapping explanation.

Similarly, the head suspension to which the wiring structure of the fifth embodiment is applied is the same as that illustrated in FIGS. 1 and 2, and therefore, the details of the head suspension itself will not be explained.

A flexure 7D having the wiring structure of the fifth embodiment includes read wiring 45 whose position differs from the read wiring 45 of the third embodiment of FIG. 8. Namely, the fifth embodiment arranges sensor wiring 37, the read wiring 45, heater wiring 49, and write wiring 47D in this order.

The heater wiring 49 includes positive/negative wires 49a and 49b that are laid one on another with an intermediate insulating layer 57D interposed between them.

The sensor wiring 37, read wiring 45, heater wiring 49, and write wiring 47D are covered with a cover insulating layer equivalent to the cover insulating layer 43 of FIG. 4.

The fifth embodiment provides effect that is similar to the effect of the third embodiment.

Figure 11:
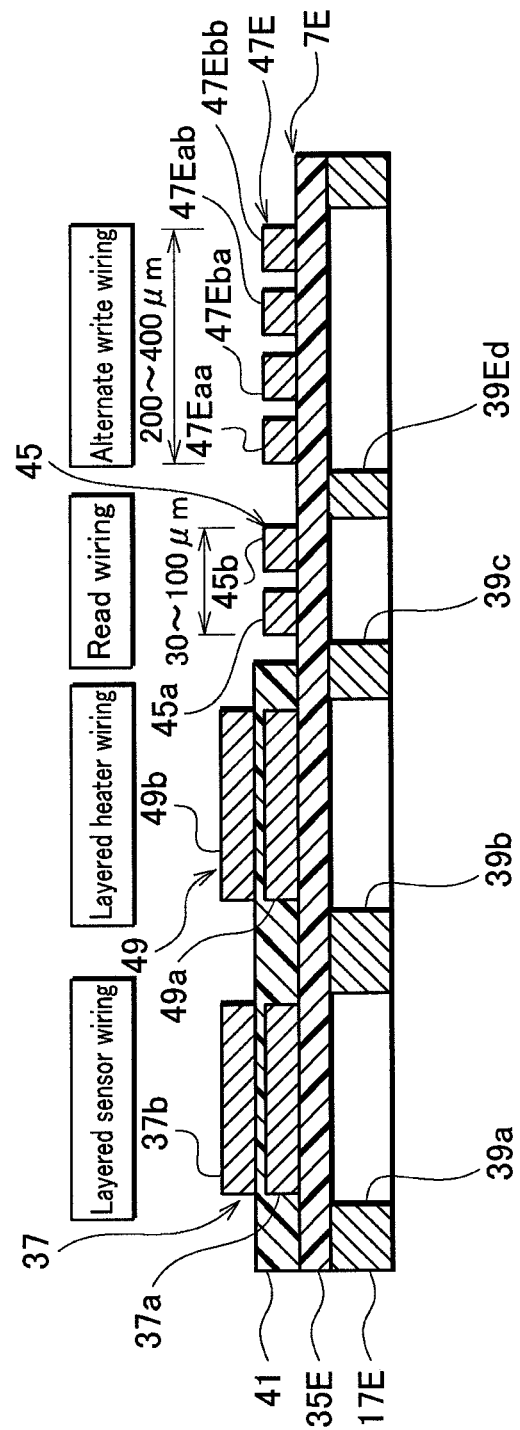
FIG. 11 is a sectional view at a location corresponding to the location of line III-III of FIG. 1, illustrating a layer configuration of a wiring structure according to a sixth embodiment of the present invention, a cover insulating layer being omitted.
Figure 12:
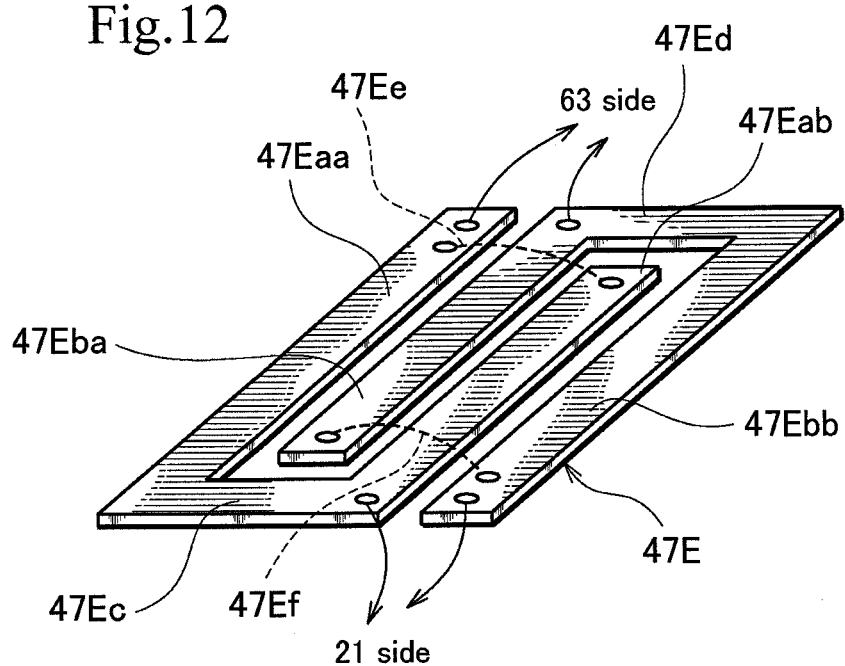
FIG. 12 is a perspective view illustrating alternate wires in the wiring structure according to the sixth embodiment.
Figure 13:
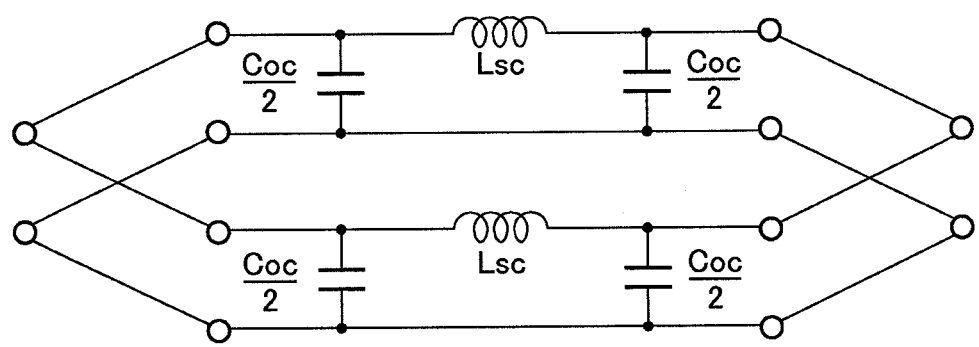
FIG. 13 is a circuit diagram illustrating an equivalent circuit of FIG. 12.

A wiring structure for a head suspension according to a sixth embodiment of the present invention will be explained with reference to FIGS. 11 to 13 in which FIG. 11 is a sectional view at a location corresponding to the location of line III-III of FIG. 1, FIG. 12 is a perspective view illustrating alternate wires in the wiring structure, and FIG. 13 is a circuit diagram illustrating an equivalent circuit of FIG. 12.

A basic configuration of the sixth embodiment is the same as that of the first embodiment of FIG. 6, and therefore, the parts of FIG. 11 that are the same as or similar to those of FIG. 6 are represented with the same reference marks or the same reference marks plus "E" to omit overlapping explanation.

Similarly, the head suspension to which the wiring structure of the sixth embodiment is applied is the same as that illustrated in FIGS. 1 and 2, and therefore, the details of the head suspension itself will not be explained.

A flexure 7E having the wiring structure of the sixth embodiment includes write wiring 47E of the alternate wires of FIG. 12. This arrangement is disclosed in, for example, Japanese Unexamined Patent Application Publication No. H10-124837.

The write wiring 47E is formed on the base insulating layer 35E. The write wiring 47E includes positive/negative wires, i.e., first and second alternately-arranged wires 47Eaa, 47Eab, 47Eba, and 47Ebb having the same width. The write wiring 47E as a whole has a width in the range of about 200 to 400 μm.

First ends of the first alternately-arranged wires 47Eaa and 47Eab are connected to each other through a bypass wire 47Ec and second ends thereof are connected to each other through a bridge 47Ee crossing the second alternately-arranged wire 47Eba. First ends of the second alternately-arranged wires 47Eba and 47Ebb are connected to each other through a bypass wire 47Ed and second ends thereof are connected to each other through a bridge 47Ef crossing the first alternately-arranged wire 47Eab.

Sensor wiring 37, heater wiring 49, read wiring 45, and the write wiring 47E are covered with a cover insulating layer equivalent to the cover insulating layer 43 of FIG. 4.

The sixth embodiment provides effect that is similar to the effect of the first embodiment, and in addition, reduces the loss and impedance of the write wiring 47E and widens the bandwidth thereof.

A wiring structure for a head suspension according to a seventh embodiment of the present invention will be explained with reference to FIG. 14 that is a sectional view at a location corresponding to the location of line III-III of FIG. 1.

Figure 14:
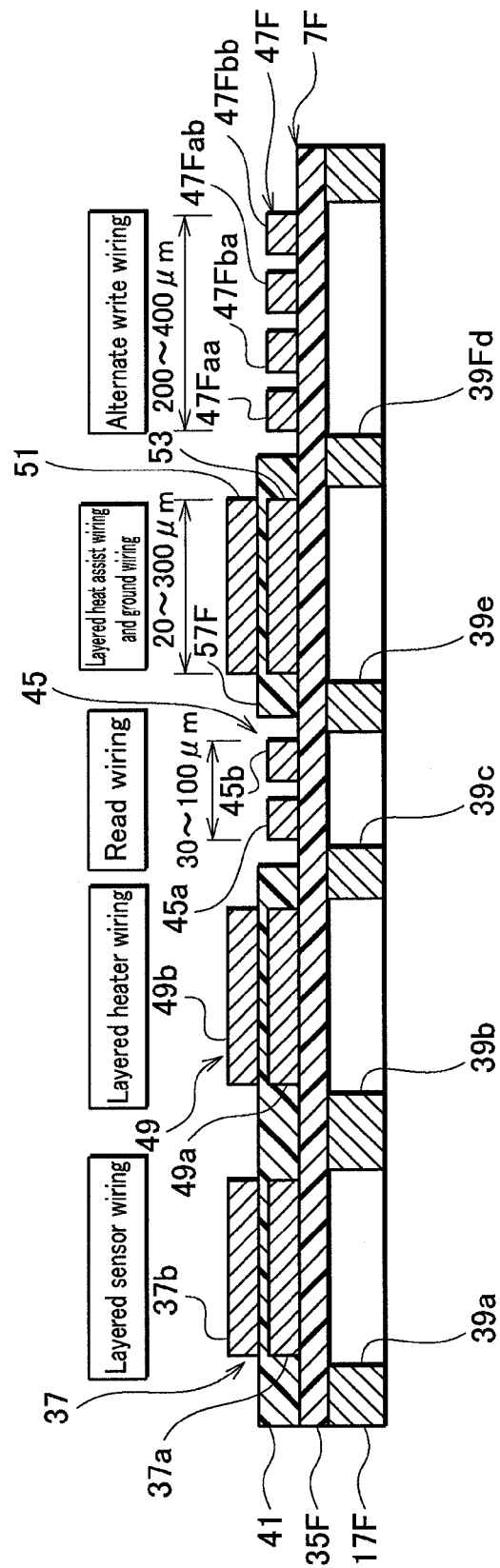
FIG. 14 is a sectional view at a location corresponding to the location of line III-III of FIG. 1, illustrating a layer configuration of a wiring structure according to a seventh embodiment of the present invention, a cover insulating layer being omitted.

A basic configuration of the seventh embodiment is the same as that of the sixth embodiment of FIG. 11, and therefore, the parts of FIG. 14 that are the same as or similar to those of FIG. 11 are represented with the same reference marks or the same reference marks plus "F" instead of "E" to omit overlapping explanation.

Similarly, the head suspension for which the wiring structure of the seventh embodiment is applied is the same as that illustrated in FIGS. 1 and 2, and therefore, the details of the head suspension itself will not be explained.

A flexure 7F having the wiring structure of the seventh embodiment includes, in addition to the configuration of the sixth embodiment of FIG. 11, heat assist wiring 51 and ground wiring 53 like the fourth embodiment of FIG. 9. The ground wiring 53 is formed on the base insulating layer 35F and covered with an intermediate insulating layer 57F. On the intermediate insulating layer 57F, the heat assist wiring 51 is formed. Namely, the heat assist wiring 51 and ground wiring 53 are laid one on another with the intermediate insulating layer 57F interposed between them.

Sensor wiring 37, heater wiring 49, read wiring 45, the heat assist wiring 51, and write wiring 47F are covered with a cover insulating layer equivalent to the cover insulating layer 43 of FIG. 4.

The seventh embodiment provides effect that is similar to the effect of the sixth embodiment, and in addition, reduces the loss and impedance of the heat assist wiring 51 and narrows the bandwidth thereof.

A wiring structure for a head suspension according to an eighth embodiment of the present invention will be explained with reference to FIG. 15 that is a sectional view at a location corresponding to the location of line III-III of FIG. 1.

Figure 15:
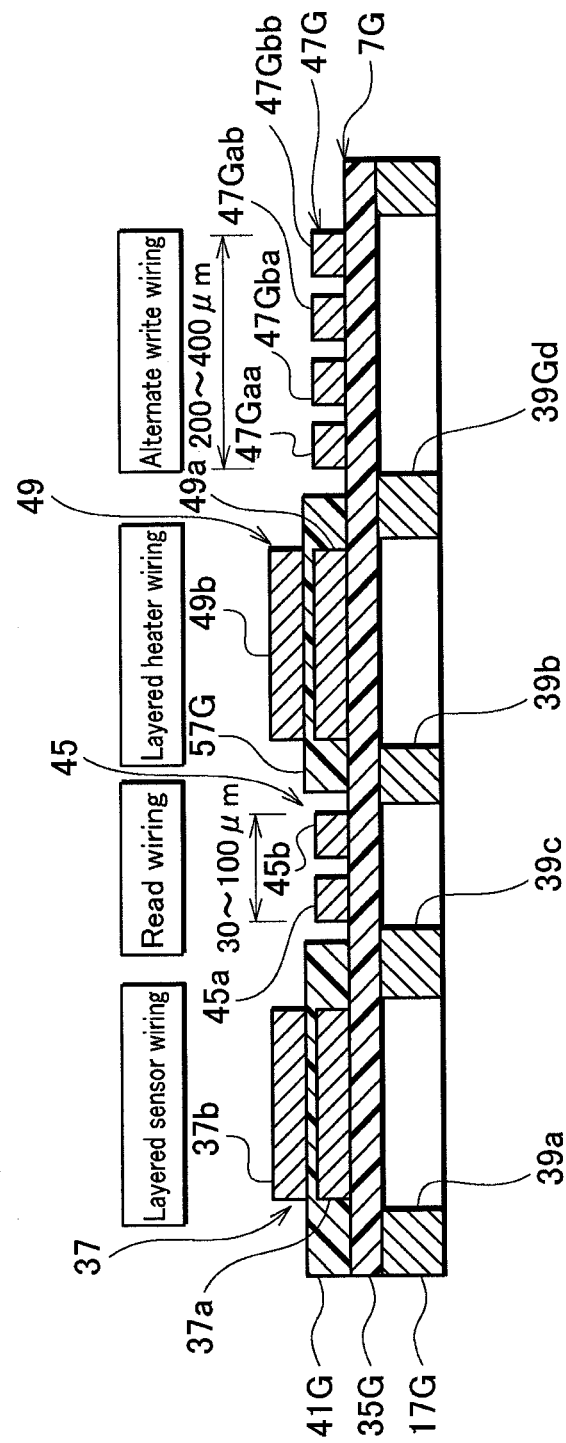
FIG. 15 is a sectional view at a location corresponding to the location of line III-III of FIG. 1, illustrating a layer configuration of a wiring structure according to an eighth embodiment of the present invention, a cover insulating layer being omitted.

A basic configuration of the eighth embodiment is the same as that of the sixth embodiment of FIG. 11, and therefore, the parts of FIG. 15 that are the same as or similar to those of FIG. 11 are represented with the same reference marks or the same reference marks plus "G" instead of "E" to omit overlapping explanation.

Similarly, the head suspension for which the wiring structure of the eighth embodiment is applied is the same as that illustrated in FIGS. 1 and 2, and therefore, the details of the head suspension itself will not be explained.

A flexure 7G having the wiring structure of the eighth embodiment includes read wiring 45 whose position differs from the read wiring 45 of the sixth embodiment of FIG. 11. Namely, the eighth embodiment arranges sensor wiring 37, the read wiring 45, heater wiring 49, and write wiring 47G side by side in this order.

The heater wiring 49 includes positive/negative wires 49a and 49b that are laid one on another with an intermediate insulating layer 57G interposed between them.

The sensor wiring 37, read wiring 45, heater wiring 49, and write wiring 47G are covered with a cover insulating layer equivalent to the cover insulating layer 43 of FIG. 4.

The eighth embodiment provides effect that is similar to the effect of the sixth embodiment.

A wiring structure for a head suspension according to a ninth embodiment of the present invention will be explained with reference to FIG. 16 that is a sectional view at a location corresponding to the location of line III-III of FIG. 1.

Figure 16:
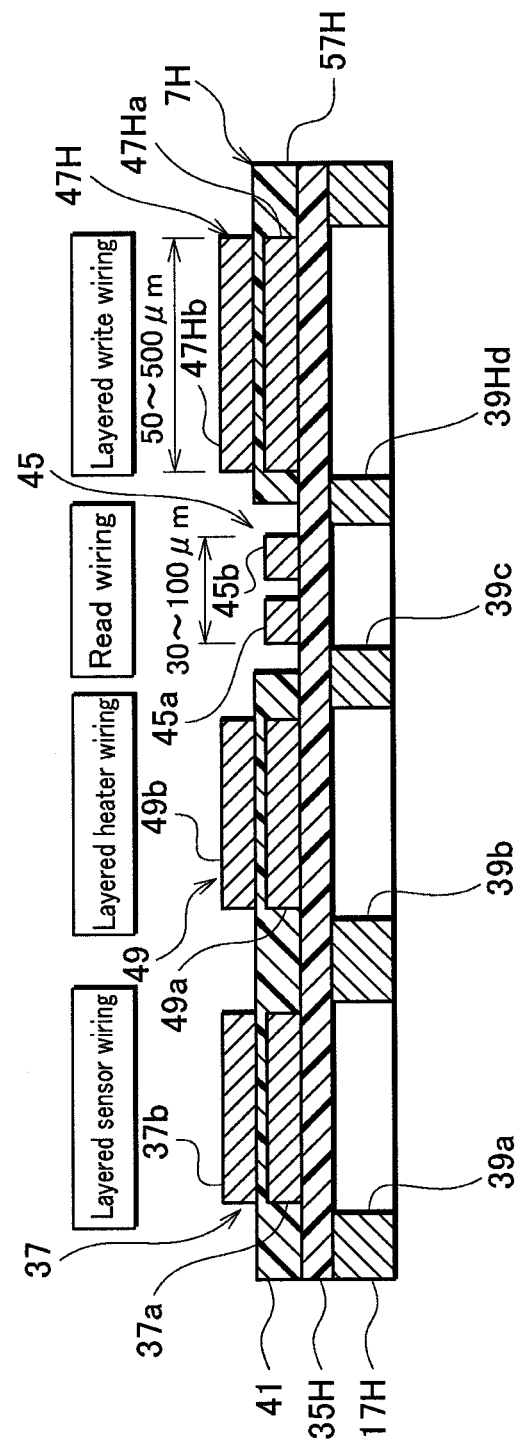
FIG. 16 is a sectional view at a location corresponding to the location of line III-III of FIG. 1, illustrating a layer configuration of a wiring structure according to a ninth embodiment of the present invention, a cover insulating layer being omitted.

A basic configuration of the ninth embodiment is the same as that of the first embodiment of FIG. 6, and therefore, the parts of FIG. 16 that are the same as or similar to those of FIG. 6 are represented with the same reference marks or the same reference marks plus "H" to omit overlapping explanation.

Similarly, the head suspension for which the wiring structure of the ninth embodiment is applied is the same as that illustrated in FIGS. 1 and 2, and therefore, the details of the head suspension itself will not be explained.

A flexure 7H having the wiring structure of the ninth embodiment is provided with a write wiring 47H including positive/negative wires 47Ha and 47Hb that are laid one on another with an intermediate insulating layer 57H interposed between them.

The write wiring 47H has a width in the range of about 50 to 500 μm that is wider than the individual width of read wiring 45, sensor wiring 37, and heater wiring 49. The write wire 47Ha is formed on the base insulating layer 35H. Formed on the write wire 47Ha is the intermediate insulating layer 57H on which the write wire 47Hb is formed.

The sensor wiring 37, heater wiring 49, read wiring 45, and write wiring 47H are covered with a cover insulating layer equivalent to the cover insulating layer 43 of FIG. 4.

The ninth embodiment provides effect that is similar to the effect of the first embodiment, and in addition, reduces the loss and impedance of the write wiring 47H and widens the bandwidth thereof.

A wiring structure for a head suspension according to a tenth embodiment of the present invention will be explained with reference to FIG. 17 that is a sectional view at a location corresponding to the location of line III-III of FIG. 1.

Figure 17:
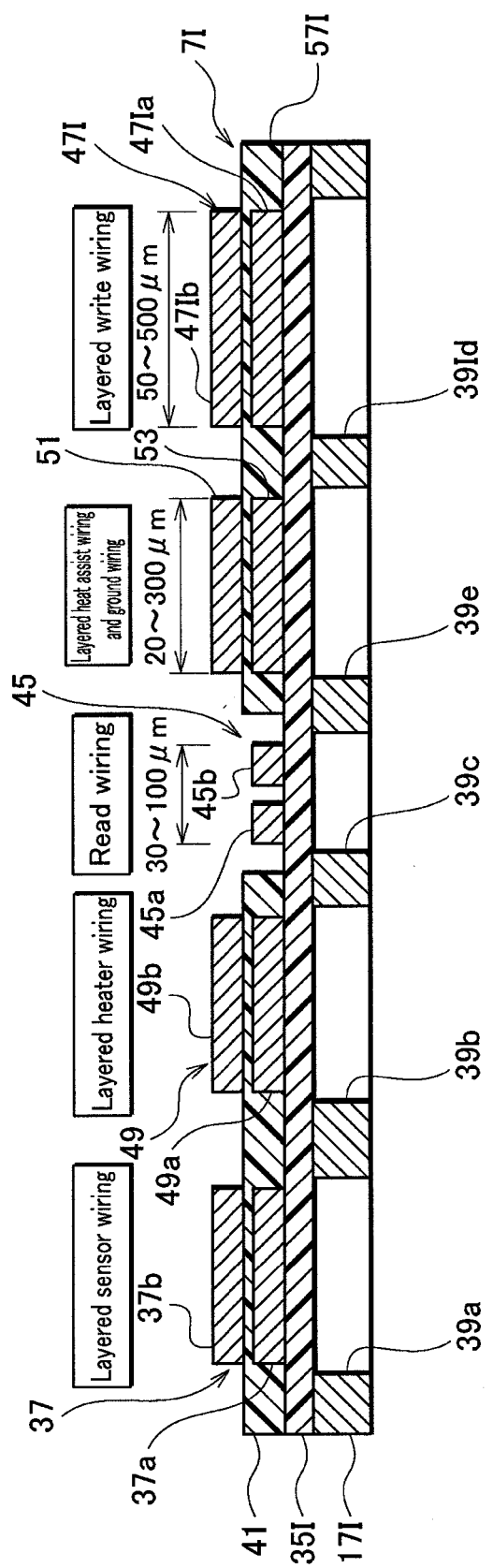
FIG. 17 is a sectional view at a location corresponding to the location of line III-III of FIG. 1, illustrating a layer configuration of a wiring structure according to a tenth embodiment of the present invention, a cover insulating layer being omitted.

A basic configuration of the tenth embodiment is the same as that of the ninth embodiment of FIG. 16, and therefore, the parts of FIG. 17 that are the same as or similar to those of FIG. 16 are represented with the same reference marks or the same reference marks plus "I" instead of "H" to omit overlapping explanation.

Similarly, the head suspension for which the wiring structure of the tenth embodiment is applied is the same as that illustrated in FIGS. 1 and 2, and therefore, the details of the head suspension itself will not be explained.

A flexure 7I having the wiring structure of the tenth embodiment includes, in addition to the wiring structure of the ninth embodiment of FIG. 16, heat assist wiring 51 and ground wiring 53 like the fourth embodiment of FIG. 9. The ground wiring 53 is formed on the base insulating layer 35I and covered with an intermediate insulating layer 57I. On the intermediate insulating layer 57I, the heat assist wiring 51 is formed. Namely, the heat assist wiring 51 and ground wiring 53 are laid one on another with the intermediate insulating layer 57I interposed between them.

Sensor wiring 37, heater wiring 49, read wiring 45, the heat assist wiring 51, and write wiring 47I are covered with a cover insulating layer equivalent to the cover insulating layer 43 of FIG. 4.

The tenth embodiment provides effect that is similar to the effect of the ninth embodiment, and in addition, reduces the loss and impedance of the heat assist wiring 51 and narrows the bandwidth thereof.

A wiring structure for a head suspension according to an eleventh embodiment of the present invention will be explained with reference to FIG. 18 that is a sectional view at a location corresponding to the location of line III-III of FIG. 1.

Figure 18:
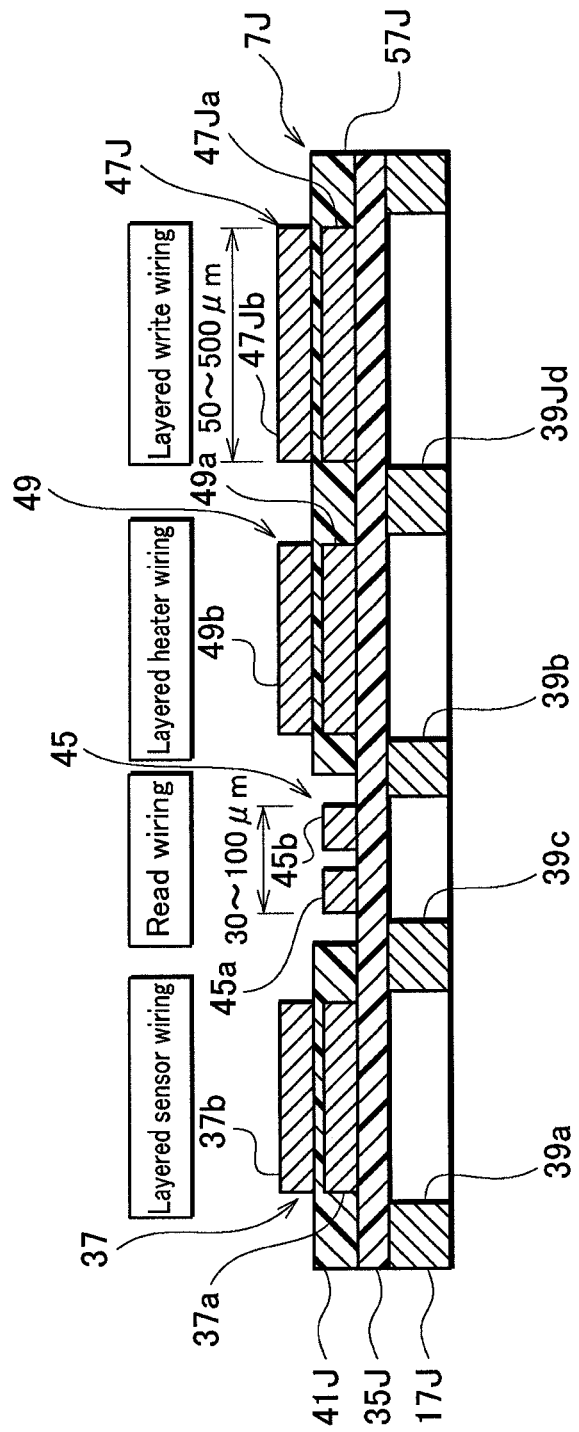
FIG. 18 is a sectional view at a location corresponding to the location of line III-III of FIG. 1, illustrating a layer configuration of a wiring structure according to an eleventh embodiment of the present invention, a cover insulating layer being omitted.

A basic configuration of the eleventh embodiment is the same as that of the ninth embodiment of FIG. 16, and therefore, the parts of FIG. 18 that are the same as or similar to those of FIG. 16 are represented with the same reference marks or the same reference marks plus "J" instead of "H" to omit overlapping explanation.

Similarly, the head suspension for which the wiring structure of the eleventh embodiment is applied is the same as that illustrated in FIGS. 1 and 2, and therefore, the details of the head suspension itself will not be explained.

A flexure 7J having the wiring structure of the eleventh embodiment includes read wiring 45 whose position differs from the read wiring 45 of the ninth embodiment of FIG. 16. Namely, the eleventh embodiment arranges sensor wiring 37, the read wiring 45, heater wiring 49, and write wiring 47J side by side in this order.

The heater wiring 49 includes positive/negative wires 49a and 49b that are laid one on another with an intermediate insulating layer 57J interposed between them.

The sensor wiring 37, read wiring 45, heater wiring 49, and write wiring 47J are covered with a cover insulating layer equivalent to the cover insulating layer 43 of FIG. 4.

The eleventh embodiment provides effect that is similar to the effect of the ninth embodiment.

A wiring structure for a head suspension according to a twelfth embodiment of the present invention will be explained with reference to FIG. 19 that is a sectional view at a location corresponding to the location of line III-III of FIG. 1.

Figure 19:
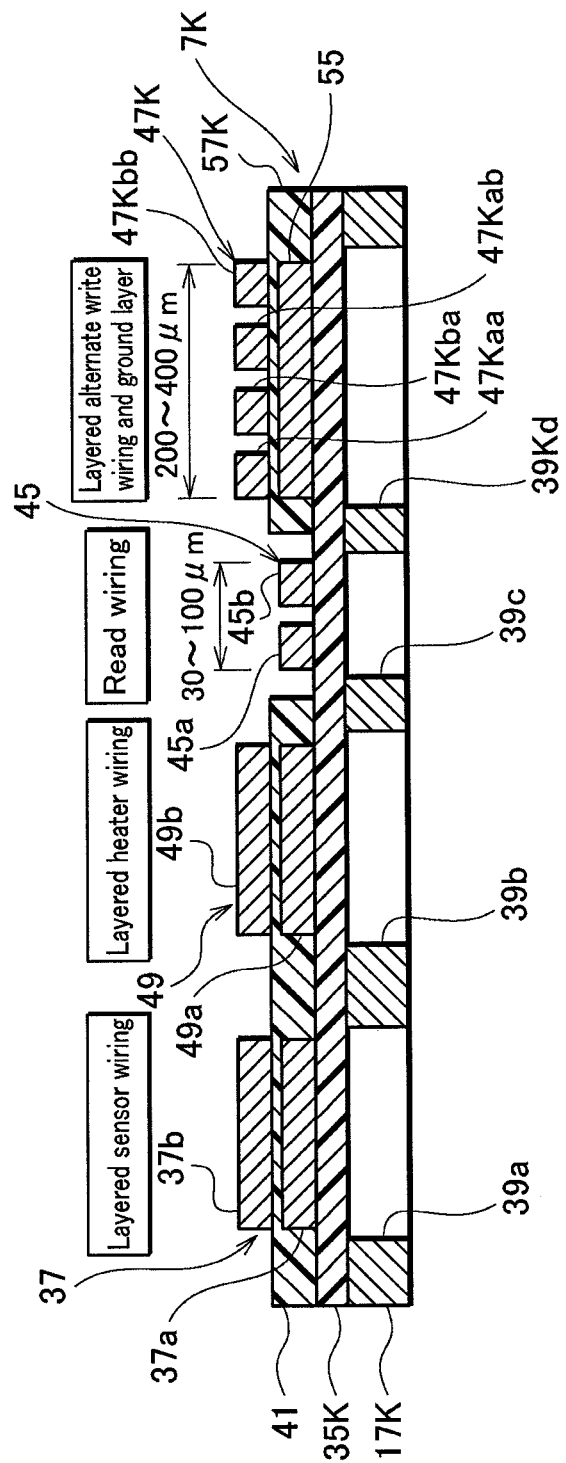
FIG. 19 is a sectional view at a location corresponding to the location of line III-III of FIG. 1, illustrating a layer configuration of a wiring structure according to a twelfth embodiment of the present invention, a cover insulating layer being omitted.

A basic configuration of the twelfth embodiment is the same as that of the third embodiment of FIG. 8, and therefore, the parts of FIG. 19 that are the same as or similar to those of FIG. 8 are represented with the same reference marks or the same reference marks plus "K" instead of "B" to omit overlapping explanation.

Similarly, the head suspension for which the wiring structure of the twelfth embodiment is applied is the same as that illustrated in FIGS. 1 and 2, and therefore, the details of the head suspension itself will not be explained.

A flexure 7K having the wiring structure of the twelfth embodiment includes, instead of the write wiring 47B of the third embodiment of FIG. 8, alternate write wiring 47K similar to the alternate write wiring 47E of the sixth embodiment of FIG. 11.

The write wiring 47K has a total width in the range of about 200 to 400 μm. A ground layer 55 is formed on the base insulating layer 35K and an intermediate insulating layer 57K is formed on the ground layer 55. On the intermediate insulating layer 57K, the write wiring 47K is formed. Namely, the write wiring 47K and ground layer 55 are laid one on another with the intermediate insulating layer 57K interposed between them.

Sensor wiring 37, heater wiring 49, read wiring 45, and the write wiring 47K are covered with a cover insulating layer equivalent to the cover insulating layer 43 of FIG. 4.

The twelfth embodiment provides effect that is similar to the effect of the third embodiment, and in addition, reduces the loss and impedance of the write wiring 47K and widens the bandwidth thereof.

A wiring structure for a head suspension according to a thirteenth embodiment of the present invention will be explained with reference to FIG. 20 that is a sectional view at a location corresponding to the location of line III-III of FIG. 1.

Figure 20:
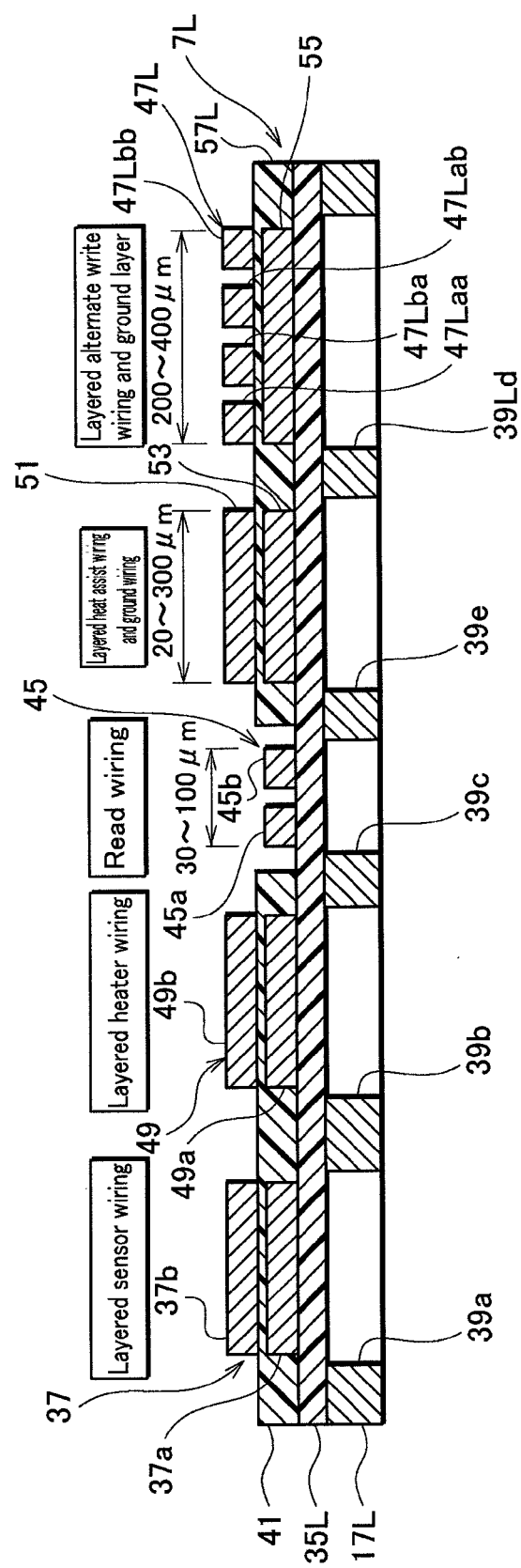
FIG. 20 is a sectional view at a location corresponding to the location of line III-III of FIG. 1, illustrating a layer configuration of a wiring structure according to a thirteenth embodiment of the present invention, a cover insulating layer being omitted.

A basic configuration of the thirteenth embodiment is the same as that of the twelfth embodiment of FIG. 19, and therefore, the parts of FIG. 20 that are the same as or similar to those of FIG. 19 are represented with the same reference marks or the same reference marks plus "L" instead of "K" to omit overlapping explanation.

Similarly, the head suspension for which the wiring structure of the thirteenth embodiment is applied is the same as that illustrated in FIGS. 1 and 2, and therefore, the details of the head suspension itself will not be explained.

A flexure 7L having the wiring structure of the thirteenth embodiment includes, in addition to the wiring structure of the twelfth embodiment of FIG. 19, heat assist wiring 51 and ground wiring 53 like the fourth embodiment of FIG. 9. The ground wiring 53 is formed on the base insulating layer 35L and covered with an intermediate insulating layer 57L. On the intermediate insulating layer 57L, the heat assist wiring 51 is formed. Namely, the heat assist wiring 51 and ground wiring 53 are laid one on another with the intermediate insulating layer 57L interposed between them.

Sensor wiring 37, heater wiring 49, read wiring 45, the heat assist wiring 51, and write wiring 47L are covered with a cover insulating layer equivalent to the cover insulating layer 43 of FIG. 4.

The thirteenth embodiment provides effect that is similar to the effect of the twelfth embodiment, and in addition, reduces the loss and impedance of the heat assist wiring 51 and narrows the bandwidth thereof.

A wiring structure for a head suspension according to a fourteenth embodiment of the present invention will be explained with reference to FIG. 21 that is a sectional view at a location corresponding to the location of line III-III of FIG. 1.

Figure 21:
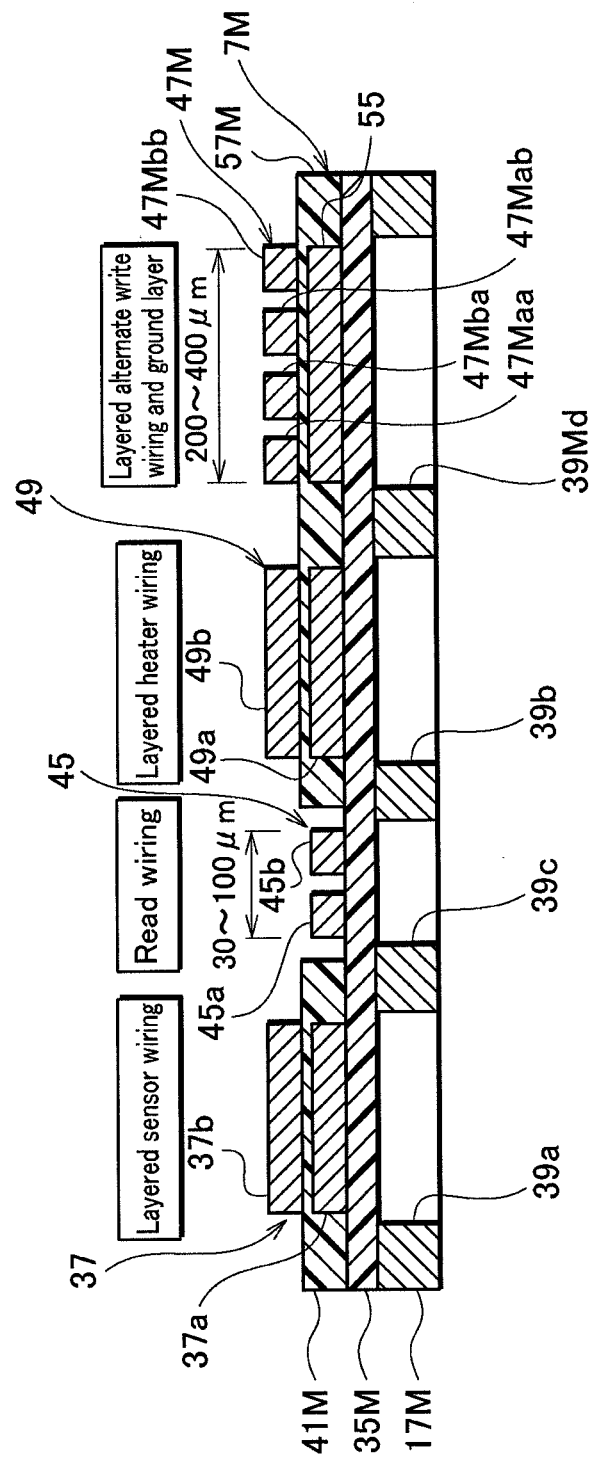
FIG. 21 is a sectional view at a location corresponding to the location of line III-III of FIG. 1, illustrating a layer configuration of a wiring structure according to a fourteenth embodiment of the present invention, a cover insulating layer being omitted.

A basic configuration of the fourteenth embodiment is the same as that of the twelfth embodiment of FIG. 19, and therefore, the parts of FIG. 21 that are the same as or similar to those of FIG. 19 are represented with the same reference marks or the same reference marks plus "M" instead of "K" to omit overlapping explanation.

Similarly, the head suspension for which the wiring structure of the fourteenth embodiment is applied is the same as that illustrated in FIGS. 1 and 2, and therefore, the details of the head suspension itself will not be explained.

A flexure 7M having the wiring structure of the fourteenth embodiment includes read wiring 45 whose position differs from the read wiring 45 of the twelfth embodiment of FIG. 19. Namely, the fourteenth embodiment arranges sensor wiring 37, the read wiring 45, heater wiring 49, and write wiring 47M side by side in this order.

The heater wiring 49 includes positive/negative wires 49a and 49b that are laid one on another with an intermediate insulating layer 57M interposed between them.

The sensor wiring 37, read wiring 45, heater wiring 49, and write wiring 47M are covered with a cover insulating layer equivalent to the cover insulating layer 43 of FIG. 4.

The fourteenth embodiment provides effect that is similar to the effect of the twelfth embodiment.

What is claimed is:

1. A wiring structure for a head suspension, the head suspension comprising:
   a head to write and read information to and from a recording medium,
   a load beam to apply load onto the head,
   a device arranged on the head and operating on low-frequency signals to achieve a function other than the information write/read function at the head, and
   a flexure attached to the load beam and supporting the head, the flexure including a base material made of a conductive thin plate and a base insulating layer formed on the base material;
   wherein the device includes a heater and a sensor that are arranged on the head, the heater thermally expanding and displacing a medium-confronting face of the head relative to the recording medium, the sensor detecting if the medium-confronting face hits the recording medium, and
   the wiring structure comprising:
   a write wiring and a read wiring formed on the base insulating layer and connected to the head;
   a device wiring formed on the base insulating layer and connected to the device; and
   an intermediate insulating layer on the base insulating layer; and
   wherein the device wiring is formed wider than the read wiring and includes positive/negative wires that are laid one on another with the intermediate insulating layer interposed between the positive/negative wires;
   wherein the device wiring includes heater wiring for the heater and sensor wiring for the sensor, at least the sensor wiring being formed wider than the read wiring, the sensor wiring having positive/negative wires that are laid one on another with the intermediate insulating layer interposed between the positive/negative wires, and
   wherein the heater wiring and the read wiring are arranged between the sensor wiring and the write wiring in a width direction of the flexure.

2. The wiring structure for a head suspension of claim 1, further comprising: a ground layer formed on the base insulating layer; the write wiring being formed wider than the read wiring and laid on the ground layer with the intermediate insulating layer interposed between them; and the sensor wiring, heater wiring, read wiring, and write wiring that are arranged side by side in this order.

3. The wiring structure for a head suspension of claim 2, wherein the write wiring is formed narrower than the sensor wiring.

4. The wiring structure for a head suspension of claim 1, further comprising: a ground layer formed on the base insulating layer; the write wiring being formed wider than the read wiring and laid on the ground layer with the intermediate insulating layer interposed between them; and the sensor wiring, read wiring, heater wiring, and write wiring that are arranged side by side in this order.

5. The wiring structure for a head suspension of claim 4, wherein the write wiring is formed narrower than the sensor wiring.

6. The wiring structure for a head suspension of claim 1, wherein the write wiring includes first and second alternately-arranged wires on the base insulating layer, the first alternately-arranged wires having first ends connected to each other through a bypass wire and second ends connected to each other through a bridge crossing one of the second alternately-arranged wires, the second alternately-arranged wires having first ends connected to each other through a bypass wire and second ends connected to each other through a bridge crossing one of the first alternately-arranged wires, and the sensor wiring, heater wiring, read wiring, and write wiring are arranged side by side in this order.

7. The wiring structure for a head suspension of claim 1, wherein the write wiring includes first and second alternately-arranged wires on the base insulating layer, the first alternately-arranged wires having first ends connected to each other through a bypass wire and second ends connected to each other through a bridge crossing one of the second alternately-arranged wires, the second alternately-arranged wires having first ends connected to each other through a bypass wire and second ends connected to each other through a bridge crossing one of the first alternately-arranged wires, and the sensor wiring, read wiring, heater wiring, and write wiring are arranged side by side in this order.

8. The wiring structure for a head suspension of claim 1, wherein the write wiring is formed wider than the sensor wiring and includes positive/negative wires that are laid one on another with the intermediate insulating layer interposed between the positive/negative wires, and the sensor wiring, heater wiring, read wiring, and write wiring are arranged side by side in this order.

9. The wiring structure for a head suspension of claim 8, wherein the device further includes a heat assist element heating a recording layer of the recording medium and thereby thermally stabilizing magnetization of the recording layer, the device wiring further includes a heat assist wiring and a ground wiring for the heat assist element, the ground wiring being formed on the base insulating layer, the heat assist wiring being laid on the ground wiring with the intermediate insulating layer interposed between them, and the sensor wiring, heater wiring, read wiring, heat assist wiring, and write wiring are arranged side by side in this order.

10. The wiring structure for a head suspension of claim 1, wherein the write wiring is formed wider than the sensor wiring and includes positive/negative wires that are laid one on another with the intermediate insulating layer interposed between the positive/negative wires, and the sensor wiring, read wiring, heater wiring, and write wiring are arranged side by side in this order.

11. The wiring structure for a head suspension of claim 1, further comprising: a ground layer formed on the base insulating layer; the write wiring laid on the ground layer with the intermediate insulating layer interposed between them; the write wiring including first and second alternately-arranged wires on the base insulating layer, the first alternately-arranged wires having first ends connected to each other through a bypass wire and second ends connected to each other through a bridge crossing one of the second alternately-arranged wires, the second alternately-arranged wires having first ends connected to each other through a bypass wire and second ends connected to each other through a bridge crossing one of the first alternately-arranged wires; and the sensor wiring, heater wiring, read wiring, and write wiring that are arranged side by side in this order.

12. The wiring structure for a head suspension of claim 1, further comprising: a ground layer formed on the base insulating layer; the write wiring laid on the ground layer with the intermediate insulating layer interposed between them; the write wiring including first and second alternately-arranged wires on the base insulating layer, the first alternately-arranged wires having first ends connected to each other through a bypass wire and second ends connected to each other through a bridge crossing one of the second alternately-arranged wires, the second alternately-arranged wires having first ends connected to each other through a bypass wire and second ends connected to each other through a bridge crossing one of the first alternately-arranged wires; and the sensor wiring, read wiring, heater wiring, and write wiring that are arranged side by side in this order.

13. The wiring structure of claim 1, wherein the device further comprises a heat assist element heating a recording layer of the recording medium and thereby thermally stabilizing magnetization of the recording layer, and wherein the device wiring further includes a heat assist wiring and a ground wiring for the heat assist element, the ground wiring being formed on the base insulating layer, the heat assist wiring being laid on the ground wiring with the intermediate insulating layer interposed there between, and the heat assist wiring being arranged between the sensor wiring and the write wiring in the width direction of the flexure together with the heater wiring and the read wiring.

14. The wiring structure of claim 13, wherein one of the heater wiring and the heat assist wiring laid on the ground wiring is arranged between the write wiring and the read wiring in the width direction of the flexure.

15. The wiring flexure of claim 14, further comprising a ground layer formed on the base insulating layer; and wherein the write wiring is formed wider than the read wiring and laid on the ground layer with the intermediate insulating layer interposed there between.

16. The wiring structure of claim 15, wherein the write wiring is formed narrower than the sensor wiring.

17. The wiring structure of claim 14, wherein the write wiring includes first and second alternately-arranged wires on the base insulating layer, the first alternately-arranged wires having first ends connected to each other through a bypass wire and second ends connected to each other through a bridge crossing one of the second alternately-arranged wires, the second alternately-arranged wires having first ends connected to each other through a bypass wire and second ends connected to each other through a bridge crossing one of the first alternately-arranged wires.

18. The wiring structure of claim 14, further comprising a ground layer formed on the base insulating layer, and wherein the write wiring is laid on the ground layer with the intermediate insulating layer interposed there between, wherein the write wiring includes first and second alternately-arranged wires on the base insulating layer, wherein the first alternately-arranged wires have first ends connected to each other through a bypass wire and second ends connected to each other through a bridge crossing one of the second alternately-arranged wires, and wherein the second alternately-arranged wires have first ends connected to each other through a bypass wire and second ends connected to each other through a bridge crossing one of the first alternately-arranged wires.

* * * * *